US011622389B2

(12) United States Patent
Sakhnini et al.

(10) Patent No.: US 11,622,389 B2
(45) Date of Patent: Apr. 4, 2023

(54) METHOD AND APPARATUS FOR RACH COMMUNICATION WITH MULTI SUBCARRIER SPACING CONFIGURATION

(71) Applicant: QUALCOMM Incorporated, San Diego, CA (US)

(72) Inventors: Iyab Issam Sakhnini, San Diego, CA (US); Qiang Wu, San Diego, CA (US); Tao Luo, San Diego, CA (US); Xiaoxia Zhang, San Diego, CA (US); Ahmed Abdelaziz Ibrahim Abdelaziz Zewail, San Diego, CA (US); Jun Ma, San Diego, CA (US); Mehmet Izzet Gurelli, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/215,535

(22) Filed: Mar. 29, 2021

(65) Prior Publication Data
US 2021/0352729 A1    Nov. 11, 2021

Related U.S. Application Data

(60) Provisional application No. 63/020,732, filed on May 6, 2020.

(51) Int. Cl.
*H04W 74/08*    (2009.01)
*H04L 27/26*    (2006.01)
*H04W 74/00*    (2009.01)

(52) U.S. Cl.
CPC ..... *H04W 74/0833* (2013.01); *H04L 27/2607* (2013.01); *H04L 27/26025* (2021.01); *H04W 74/008* (2013.01)

(58) Field of Classification Search
None
See application file for complete search history.

(56) References Cited

U.S. PATENT DOCUMENTS

2009/0110031 A1* 4/2009 Lakkis ............... H04J 13/16
                                                 375/E1.001
2014/0169303 A1* 6/2014 Jami ................. H04W 74/00
                                                    370/329
(Continued)

FOREIGN PATENT DOCUMENTS

WO    2018129123 A1    7/2018

OTHER PUBLICATIONS

International Search Report and Written Opinion—PCT/US2021/024968—ISA/EPO—dated Jul. 12, 2021.

*Primary Examiner* — Faiyazkhan Ghafoerkhan
(74) *Attorney, Agent, or Firm* — Procopio, Cory, Hargreaves & Savitch LLP

(57) ABSTRACT

A UE, as a part of a RACH communication procedure, may transmit a first sequence within a first set of resources having a first SCS and a second sequence within a second set of resources having a second SCS greater than the first SCS. The second sequence is transmitted with a cyclic prefix greater than inverse of the first SCS divided by a sequence length of the first sequence. The first sequence is a first PRACH preamble. The second sequence may be a second PRACH preamble, an SRS sequence, or DMRS. The UE may repeat the transmission of the first sequence for a first number of times and repeat the transmission of the second sequence for a second number of times independent of the first number.

28 Claims, 9 Drawing Sheets

(56) References Cited

U.S. PATENT DOCUMENTS

| | | | |
|---|---|---|---|
| 2015/0016312 A1* | 1/2015 | Li | H04W 74/006 |
| | | | 370/280 |
| 2016/0344526 A1* | 11/2016 | Fan | H04L 5/0091 |
| 2018/0124830 A1* | 5/2018 | Lin | H04W 74/085 |
| 2018/0198659 A1* | 7/2018 | Ko | H04L 5/005 |
| 2019/0150190 A1* | 5/2019 | Kim | H04W 56/0015 |
| | | | 370/329 |
| 2019/0215712 A1* | 7/2019 | Babaei | H04L 1/1812 |
| 2019/0215870 A1* | 7/2019 | Babaei | H04L 5/0053 |
| 2019/0230696 A1* | 7/2019 | Kim | H04L 5/00 |
| 2019/0274172 A1* | 9/2019 | Yoon | H04W 74/006 |
| 2020/0007371 A1* | 1/2020 | Ko | H04L 27/2602 |
| 2020/0053786 A1* | 2/2020 | Kim | H04W 56/00 |
| 2020/0053790 A1* | 2/2020 | Shin | H04W 74/008 |
| 2020/0107369 A1* | 4/2020 | Jeon | H04W 56/005 |
| 2020/0137792 A1* | 4/2020 | Yoon | H04W 74/08 |
| 2020/0221506 A1* | 7/2020 | Jeon | H04W 74/0808 |
| 2020/0314917 A1* | 10/2020 | Jeon | H04W 74/08 |
| 2020/0351955 A1* | 11/2020 | Jeon | H04W 80/02 |
| 2021/0136815 A1* | 5/2021 | Kim | H04W 74/006 |
| 2021/0144742 A1* | 5/2021 | Jeon | H04W 74/0833 |
| 2021/0176780 A1* | 6/2021 | Kang | H04W 74/004 |
| 2021/0176797 A1* | 6/2021 | Kang | H04B 7/0404 |
| 2021/0185710 A1* | 6/2021 | Kim | H04L 5/0053 |
| 2021/0352729 A1* | 11/2021 | Sakhnini | H04W 74/0833 |

* cited by examiner

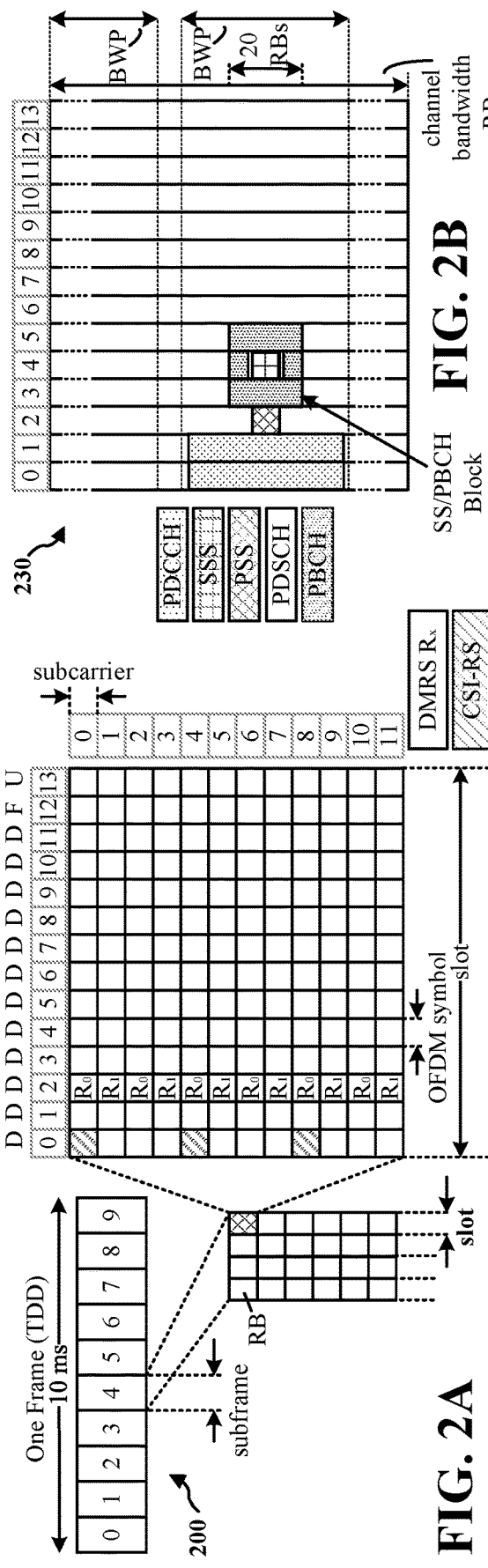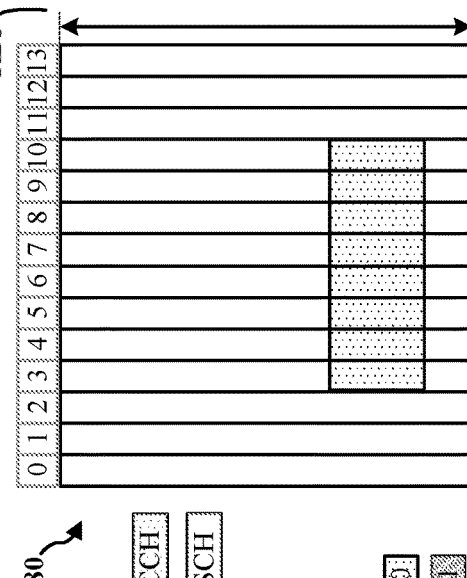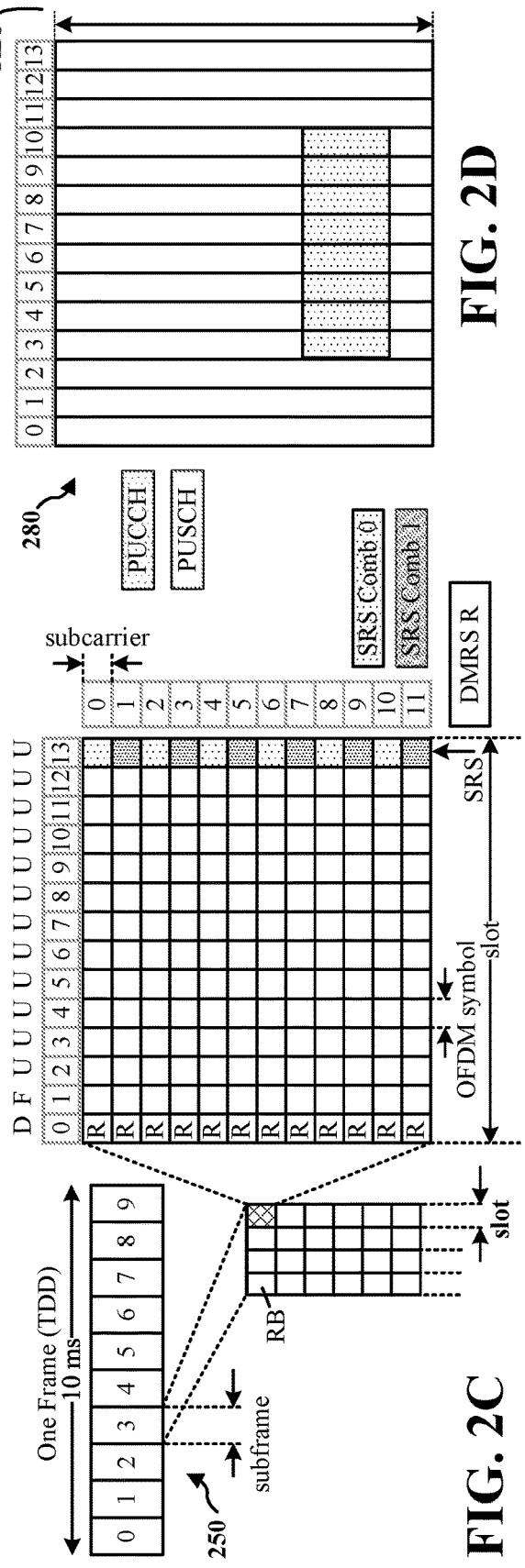

METHOD AND APPARATUS FOR RACH COMMUNICATION WITH MULTI SUBCARRIER SPACING CONFIGURATION

CROSS REFERENCE TO RELATED APPLICATION

This application claims the benefit of U.S. Provisional Application Ser. No. 63/020,732, entitled "METHOD AND APPARATUS FOR RACH COMMUNICATION WITH MULTI SUBCARRIER SPACING CONFIGURATION" and filed on May 6, 2020, which is expressly incorporated by reference herein in its entirety.

BACKGROUND

Technical Field

The present disclosure relates generally to communication systems, and more particularly, to a method and an apparatus for random access channel (RACH) communication procedure employing a multi subcarrier spacing (SCS) configuration.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE) or a base station. As a part of a random access channel (RACH) communication procedure, the UE may transmit a first sequence within a first set of resources having a first SCS and a second sequence within a second set of resources having a second SCS greater than the first SCS to a base station. The second sequence may be transmitted with a cyclic prefix greater than an inverse of the first SCS divided by a sequence length of the first sequence. The first sequence and the second sequence may be transmitted based on two different transmission opportunities that have a timing offset (TO) and/or a frequency offset (FO), the two different transmission opportunities being associated with the same RACH procedure. The UE may also determine a power offset between the first sequence and the second sequence, and the first sequence may be transmitted at a first power and the second sequence may be transmitted at a second power at the power offset with respect to the first power. The first sequence may be a first physical RACH (PRACH) preamble. The second sequence may be a second PRACH preamble, a sounding reference signal (SRS) sequence, or a demodulation reference signal (DMRS). The UE may repeat the transmission of the first sequence for a first number of times and repeat the transmission of the second sequence for a second number of times, the second number being independent of the first number. The base station may transmit configurations for a first number of repetitions for transmitting the first sequence and a second number of repetitions for transmitting the second sequence.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
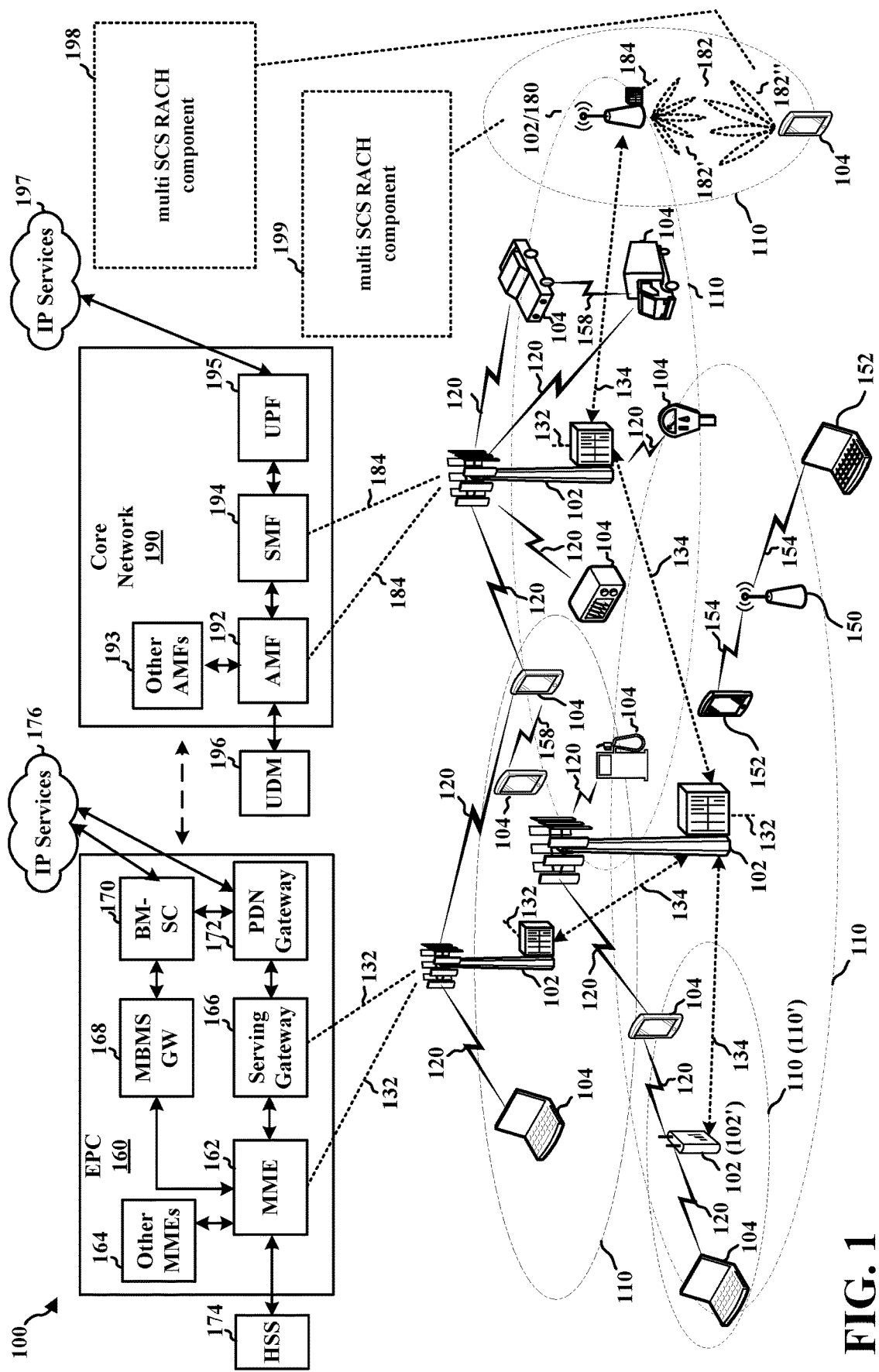
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a multi SCS RACH component 198 configured to transmit, to a base station as a part of a random access channel (RACH) procedure, a first sequence within a first set of resources having a first SCS, and transmit, to the base station as a part of the RACH procedure, a second sequence within a second set of resources having a second SCS greater than the first SCS. In certain aspects, the base station 180 may include a multi SCS RACH component 199 configured to receive, from the UE, as a part of the RACH procedure, the first sequence within the first set of resources having the first SCS, and receive, from the UE, as a part of the RACH procedure, the second sequence within the second set of resources having the second SCS greater than the first SCS. Although the following description may be focused on RACH communication procedure, the concepts described herein may be applicable to other similar areas, such as other form of communication procedure.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH, such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
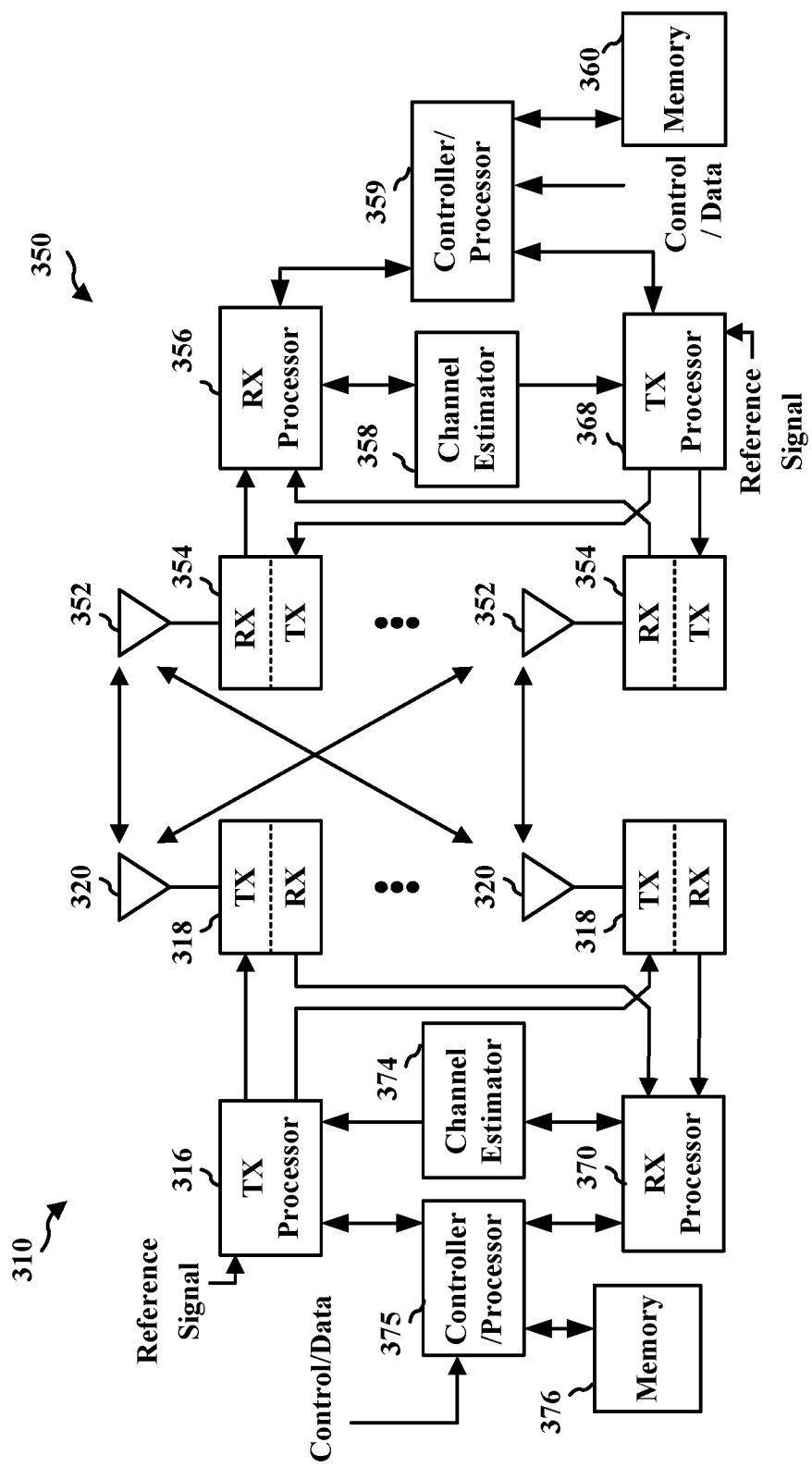
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 of the UE 350 may be configured to perform aspects in connection with 198 of FIG. 1. Also, at least one of the TX processor 316, the RX processor 370, and the controller/processor 375 of the base station 310 may be configured to perform aspects in connection with 198 of FIG. 1.

In some aspects, in wireless communications using a high radio frequency band, the transmitted signal may incur a high path loss and have a short range. The base station 102/180/310 and the UE 104/350 may utilize beamforming to compensate for the high path loss and the short range. Furthermore, in higher NR frequency bands (e.g., above 52.6 GHz), larger SCS(s) (e.g., 960 kHz, 1920 kHz, or 3840 kHz) may be considered to provide a larger BW with an increased FFT size. For example, the CP duration (or CP length or CP time) for the larger SCSs may be configured as provided in Table 1 below.

TABLE 1

<CP lengths with respect to data SCS configuration>

| Data SCS | 960 kHz | 1920 kHz | 3840 kHz |
|---|---|---|---|
| CP length (ns) | 73.2 | 36.6 | 18.3 (Example Case 1) |

Also, the design of the SCS may need to meet regulatory power specifications regarding the maximum power of the signal. The regulatory specifications for maximum power are defined per geographic region and per frequency range/band. For example, for a signal in the radio frequency band between 57-71 GHz, the U.S. regulatory specifications are: maximum equivalent isotropically radiated power (EIRP) limit=40 dBm, maximum power spectral density (PSD)=23 dBm/MHz. That is, the U.S. Federal Communications Commission (FCC) specifies that a signal transmitted in the radio frequency band between 57-71 GHz may have an EIRP less than or equal to 40 dBm and a PSD less than or equal to 23 dBm/MHz. This results in a maximum frequency bandwidth that can support the maximum PSD within the maximum EIRP limit of 50 MHz. Particularly, increasing the radio frequency of the signal may reduce the PSD because the power will be distributed across the higher bandwidth. Therefore, a signal transmitted over a 50 MHz bandwidth may need a PSD value higher than the regulated maximum PSD value to support the maximum EIRP. Accordingly, to meet the current regulatory specifications, an improved method of designing the SCS above 50 MHz may be needed. Although the above description is based on the current U.S. FCC regulatory specifications, the embodiments are not limited thereto, and the embodiments may be applied to any known or future regulatory specifications of any geographic region and corresponding frequency band as long as the SCS resign is applicable.

In a RACH procedure, the UE 104/350 may establish data communication between the UE 104/350 and the base station 102/180/310 by the UE 104/350 acquiring an uplink synchronization and obtaining a specified ID for the radio access communication from the base station 102/180/310. The RACH procedure may be a 4-step RACH procedure or a 2-step RACH procedure. In the 4-step RACH procedure, the UE 104/350 transmits a message (Msg) 1 (Msg1) including the RACH preamble to the base station 102/180/310. The base station 102/180/310 transmits a Msg2 with a random access response (RAR) including DCI over the PDCCH/PDSCH. The UE 104/350 transmits a Msg3 over the PUSCH in response to the Msg2, and the base station 102/180/310 transmits a Msg4 including a contention resolution. In the 2-step RACH procedure, the UE 104/350 transmits a MsgA, which is a combination of the Msg1 and the Msg3 of the 4-step RACH procedure. In response to receiving the MsgA, the base station transmits a MsgB, which is a combination of the Msg2 and the Msg4 of the 4-step RACH procedure.

In some aspects, several factors may be considered in designing a PRACH preamble using a Zadoff-Chu (ZC) sequence. That is, in designing the PRACH using the ZC sequence several factors may be considered including a supported cell size, the regulatory power specifications, timing resolution specifications, other channel blocking, and a sequence length (or time).

In one aspect, the supported cell size may set limits on the lengths of the CP, a guard period (GP), and a symbol length (=1/SCS). The UEs 104/350 may be located at different locations within the cell, and the UEs 104/350 may include a first UE 104/350 located at an edge of the cell and a second UE 104/350 located near the center of the cell. For the base station 102/180/310 to successfully communicate with the UE 104/350, the signals from the UE 104/350 may need to arrive at the base station 102/180/310 within the CP. Since increasing the size of the SCS results in a smaller symbol length (=1/SCS), the size of the CP within the symbol length becomes smaller, and therefore, results in a smaller coverage area.

In another aspect, the regulatory power specifications may set limits on the size of the coverage area due to the link budget. That is, due to the restrictions on the maximum EIRP and the maximum PSD, the link budget that may be utilized for a PRACH preamble may be limited, which in turn limits the size of the coverage area of the cell.

In another aspect, the timing resolution specification sets the timing resolution that the base station 102/180/310 can detect from the signal transmitted by the UEs 104/350, and therefore, sets limits on the size of the SCS and the sequence length of the PRACH preamble. The timing resolution observable at the base station PRACH detector may need to have a timing resolution fine enough for the TA command that can be used for subsequent UL transmissions. That is, the base station 102/180/310 may use the PRACH to obtain the timing resolution controlled by the SCS. The base station 102/180/310 may transmit a timing advance (TA) command to the UE, and the UE 104/350 may use the TA command to schedule the PUSCH. The timing resolution may be computed as the symbol time (1/SCS) divided by the sequence length. The timing resolution may be smaller than the CP of the UL data. That is, the TA resolution may be fine enough so that the UE 104/350 can use the TA resolution to schedule the PUSCH. For example, referring back to the example in Table 1 (referred to as Example Case 1), if the SCS of 3840 kHz is used, the CP length may be 18.3 ns. Therefore, in Example Case 1, the timing resolution may be smaller than 18.3 ns.

In another aspect, the PRACH symbol preamble may be small enough that it may not unnecessarily block other channel communications. The PRACH symbol time includes the CP duration, the symbol duration, and the GP duration and may not be too large to avoid blocking other channels for a long time. That is, configuring a smaller size of the SCS increases the length of the PRACH, and therefore, the PRACH may unnecessarily block other communication channels.

In another aspect, the sequence length may affect the detection performance of the detector at the base station 102/180/310. That is, a longer PRACH sequence length may improve the performance of the detector at the base station, while a shorter PRACH sequence length may deteriorate the performance of the detector at the base station 102/180/310.

In conclusion, the size of the SCS may result in the following communication characteristics. First, a signal having a smaller SCS (e.g., 15 kHz) may result in the following characteristics: a cell having a larger coverage area, potentially reduced timing resolution due to the limited bandwidth, increased chance of blocking other channels due to the longer symbol length, and increased cell coverage from the stronger signal energy for same bandwidth due to the longer symbol length duration. On the other hand, a signal having a larger SCS may have the following characteristics: a cell supporting a smaller coverage, a potentially increased timing resolution from the limited bandwidth, reduced chance of blocking other channels due to the shorter symbol length, and reduced cell coverage from the lower signal energy for the same bandwidth due to the shorter symbol length duration. In summary, a small SCS may have a better coverage from the stronger signal energy and the longer PRACH symbol length, but have a lower timing resolution (or a coarse timing resolution) and a higher chance of blocking other channels. A large SCS may have a higher timing resolution (or a fine timing resolution) and a reduced chance of blocking other channels, but result in a smaller coverage area from the weaker signal energy and the shorter PRACH symbol length.

Accordingly, the SCS size may be designed to support a decent cell size, not have a link budget coverage loss due to the regulatory specification, support fine timing resolution (e.g., timing resolution smaller than 18.3 ns for Example Case 1), and minimize the blockage in time for other channels (i.e., designing the SCS as the maximum value that satisfies the three specifications above).

Table 2 provides examples of possible SCS design configurations. The SCS size formats and the associated parameters for Example Case 1 from Table 1 are generated according to a conventional configuration and illustrated as below in Table 2.

TABLE 2

<SCS size formats and associated parameters for the Example Case 1>

| SCS (kHz) | $L_{Seq}$ (sequence length) | BW (MHz) | timing resolution (ns) |
|---|---|---|---|
| 15 | 139/1151 | 2.1/17.3 | 479.6/57.6 |
| 30 | 139/571 | 4.2/17.1 | 239.8/58.4 |
| 60 | 139 | 8.3 | 119.9 |
| 120 | 139 | 16.7 | 60.0 |

Table 2 illustrates that the calculated timing resolutions are greater than the CP of 18.3 ns from Example Case 1 in Table 1. Particularly, with the sequence length of 139, the timing resolutions are greater than the CP of 18.3 ns. Also, to decrease the timing resolution, the sequence length may be increased by increasing the bandwidth to 18 MHz. Particularly, the increased sequence length may be decided as the greatest prime number that may set the BW to be less than 18 MHz. Even with the increased sequence length and the increased bandwidth, the timing resolutions may still be greater than the CP of 18.3 ns. Therefore, the SCS configuration, as illustrated in Table 2, may not provide a sufficiently high timing resolution for Example Case 1.

To achieve the timing resolution, the sequence length $L_{Seq}$ may be increased to increase the BW. However, increasing the BW may reduce the capability to frequency division multiplex (FDM) multiple PRACH occasions, especially for signals in a frequency bandwidth over 50 MHz. For example, higher SCS values for the same BW may result in lower coverage due to the shorter symbol length and reduced signal energy. The SCS size formats with the BW increased to 50 MHz, and the associated parameters for Example 1 are illustrated in Table 3 below. To determine the parameters in Table 3, first the $L_{Seq}$ may be determined as the greatest prime number that results in a BW less than or equal to 50 MHz. The timing resolution is calculated from the SCS and the $L_{Seq}$.

TABLE 3

<Associated parameters with the 50 MHz BW for Example Case 1>

| SCS (kHz) | $L_{Seq}$ (sequence length) | BW (MHz) | timing resolution (ns) |
|---|---|---|---|
| 15 | 3331 | 50.0 | 20.0 |
| 30 | 1663 | 49.9 | 20.0 |
| 60 | 829 | 49.7 | 20.1 |
| 120 | 409 | 49.1 | 20.4 |
| 240 | 199 | 47.8 | 20.9 |
| 480 | 103 | 49.4 | 20.2 |
| 960 | 47 | 45.1 | 22.2 |
| 1920 | 23 | 44.2 | 22.6 |
| 3840 | 13 | 49.9 | 20.0 |

Table 3 also illustrates that the calculated timing resolutions are greater than the CP of 18.3 ns from Example Case 1 in Table 1. Furthermore, increasing the SCS reduced the sequence length $L_{Seq}$, which may deteriorate the performance of the detector at the base station. Therefore, the SCS configuration, as illustrated in Table 3, may not provide a sufficiently high timing resolution specified.

Therefore, increasing the SCS to obtain the timing resolution specifies increasing the BW and may not result in providing sufficient cell coverage. On the other hand, use of a lower SCS by increasing the BW may result in an increased length of the PRACH sequence and may result in blocking of other channels.

Figure 4:
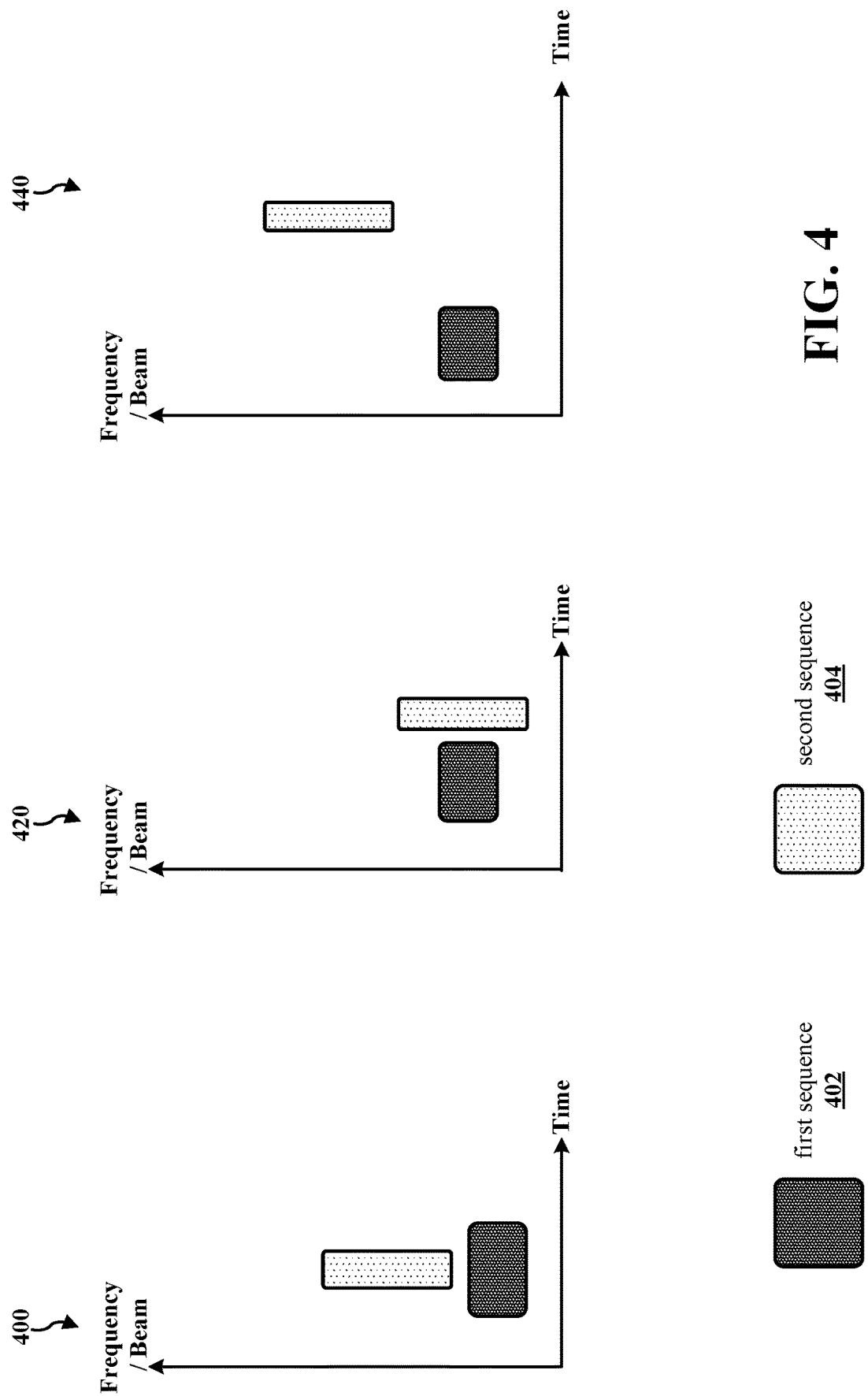
FIG. 4 is a block diagram of resource allocations and sequence configurations of a method of wireless communication.

FIG. 4 is a block diagram of resource allocations and sequence configurations of a method of wireless communication. In some aspects, the first sequence 402 and the second sequence 404 transmitted as a part of the RACH procedure may include a set of sequences, such as a set of sequences generated according to a root sequence index within a first range and/or a number of cyclic shifts within a second range. The first sequence 402 may have a first SCS ($SCS_1$), and the second sequence 404 may have a second SCS ($SCS_2$).

In one aspect, the CP and the symbol length of the second sequence may be greater than the coarse timing resolution of the first sequence. While the first sequence may provide a coarse timing resolution, since the first and the second sequences are transmitted as parts of one RACH procedure, the timing resolution of the first sequence may still need to fit within the CP and the symbol length of the second sequence. The above relation between the first sequence and the second sequence may be represented by the following formulae:

$$CP_{Seq2} > (1/SCS_{Seq1})/L_{Seq1}$$

$$1/SCS_{Seq2} > (1/SCS_{Seq1})/L_{Seq1}$$

where $CP_{Seq2}$ and $SCS_{Seq2}$ refer to the CP and the SCS of the second sequence, $SCS_{Seq1}$ and $L_{Seq1}$ refer to the SCS and the sequence length of the first sequence.

In another aspect, the first sequence and the second sequence may have various time/frequency configurations. For example, the first sequence and the second sequence may be transmitted back to back in time. In another example, the second sequence may be sent on a different transmission opportunity in time and/or frequency. That is, the second sequence may be sent with some time offset and/or frequency offset with respect to the first sequence.

According to a first configuration 400, the first sequence 402 may be separated from the second sequence 404 by frequency and/or space/beam but may at least partially overlap in time. For example, a preamble of the first sequence 402 may be time-division multiplexed on a wireless channel with a preamble of the second sequence 404.

In some aspects, a preamble of the first sequence 402 may be carried in a first set of subcarriers, whereas a preamble of the second sequence 404 may be carried in a second set of subcarriers that does not overlap with the first set of subcarriers. However, a preamble of the first sequence 402 may be carried in a first set of symbols occurring during a first portion of the preamble transmission occasion, and a preamble of the second sequence 404 may be carried in a second set of symbols occurring at least partially in the first portion of the preamble transmission occasion.

According to a second configuration 420, the first sequence 402 may be separated from the second sequence 404 in time but may at least partially overlap in frequency and/or space/beam. For example, a preamble of the first sequence 402 may be frequency-division multiplexed on a wireless channel with a preamble of the second sequence 404.

In some aspects, a preamble of the first sequence 402 may be carried in a first set of subcarriers, and a preamble of the second sequence 404 may be at least partially carried in the first set of subcarriers. However, a preamble of the first sequence 402 may be carried in a first set of symbols during a first portion of the preamble transmission occasion, whereas a preamble of the second sequence 404 may be carried in a second set of symbols during a second portion of the preamble transmission occasion that does not overlap with the first portion.

According to a third configuration 440, the first sequence 402 may be separated from the second sequence 404 by sequence configuration, but may at least partially overlap in time and in frequency and/or space/beam. For example, a preamble of the first sequence 402 may be code-division multiplexed on a wireless channel with a preamble of the second sequence 404.

In some aspects of the disclosure, the first sequence having the first SCS may be a first PRACH preamble, and the second sequence 404 having the second SCS may be a second PRACH preamble, an SRS sequence, or a DMRS. In one aspect, the first sequence 402 may be a first PRACH preamble sequence having the first SCS, and the second sequence 404 may be a second PRACH preamble sequence having the second SCS. In such configuration, the first PRACH preamble and the second PRACH preamble may compensate for each other. Particularly, the first PRACH preamble having the first SCS may have an improved coverage to provide an increased cell size and increased detection performance of the detector at the base station, while the second PRACH preamble having the second SCS greater than the first SCS may have an increased bandwidth to provide an increased timing resolution.

In another aspect, the first sequence 402 may be the PRACH, and the second sequence 404 may be an SRS sequence. Particularly, the second sequence 404 may be the SRS for a contention-free based RACH procedure, such as a beam failure recovery (BFR) procedure or a handover procedure. When the UE 502 detects the beam that the UE 502 and the base station 504 are using for communication has a reference signal received power (RSRP) that is reduced below a certain value, the UE may declare a beam failure. The UE may enter the BFR procedure, and search for a beam based on the channel state information reference signal (CSI-RS) received from the base station or select a predefined beam as the best beam and send a RACH signal or an SRS, asking the base station for permission to synch using the selected best beam. In a contention-free based RACH procedure, such as the BFR procedure or the handover procedure, the second sequence 404 may be an acceptable option to send SRS due to the large bandwidth and increased timing resolution. The SRS may be used for sounding the channel for the downlink scheduling purposes. Furthermore, SRS may be sent via more than one port, compared to the PRACH, which is sent on one port, which may enable massive DL MIMO or selection of a UL modulation and coding scheme (MCS) with higher performance.

In another aspect, the first sequence 402 may be the PRACH, and the second sequence 404 may be a DMRS to configure the 2-step RACH procedure. For the 2-step RACH procedure, the MsgA may include the PRACH preamble directly followed by the PUSCH transmission including multiple DMRS ports and DMRS sequences. The 2-step RACH procedure may be configured by the UE 502 using the first sequence 402 and the second sequence 404, where the first sequence 402 is configured to carry the PRACH preamble and the second sequence 404 is configured to carry the PUSCH transmission including the multiple DMRS ports and sequences. Therefore, the DMRS for the MsgA may use a different SCS, and may serve as the tracking RS. However, the embodiments are not limited thereto, and the first sequence 402 may carry the entire MsgA and additional DMRS may be carried by the second sequence 404. In a 4-step RACH procedure, one sequence of PRACH preamble may be used for the Msg1.

In some aspects, the UE may generate the first sequence 402 and the second sequence 404 with a power offset that indicates the quasi co-located (QCL) relationship between the first sequence 402 and the second sequence 404. This may be implemented for the 2-step RACH procedure. The first sequence 402 and the second sequence 404 may have a configurable power offset, and the two sequences may be in a QCL relationship with each other. For example, the base station 504 may determine the QCL relationship between the first sequence 402 and the second sequence 404 based on parameters (e.g., Doppler shirt, Doppler spread, average delay, delay spread, and spatial received parameter) derived from the first sequence 402 and the second sequence 404. The base station 504 may transmit the QCL relationship determination to the UE in the RAR so that the UE 502 may improve the beam formed transmissions.

Figure 5:
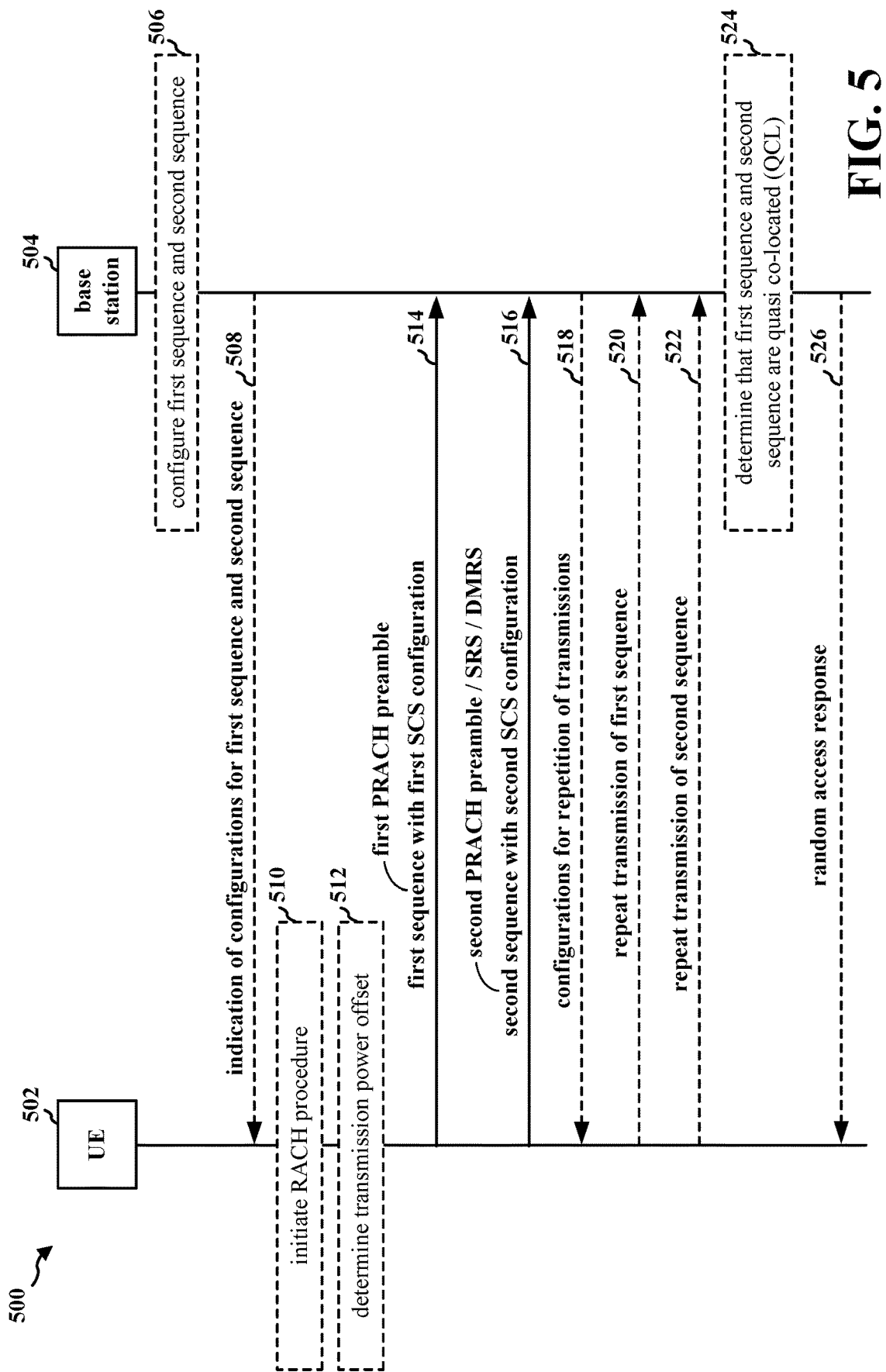
FIG. 5 is a call diagram between a UE and a base station of a method of wireless communication.

FIG. 5 is a call diagram 500 between a UE 502 and a base station 504 of a method of wireless communication. The base station 504 may configure a first sequence with a first SCS configuration and a second sequence with a second SCS configuration, where the second SCS being greater than the first SCS, and transmit an indication of configurations for the first sequence and the second sequence to the UE 502. As a part of a RACH procedure, the UE 502 may transmit, to the base station 504, the first sequence with the first SCS configuration and the second sequence with the second SCS configuration. The base station 504 may transmit, to the UE 502, configurations for repetition of transmissions of the first sequence and the second sequence. The UE 502 may repeat transmissions of the first sequence and the second sequence based on the configurations received from the base station 504.

At 506, the base station 504 may configure the first sequence with the first SCS configuration and the second sequence with the second SCS configuration for the UE. In one aspect, the second SCS may be configured to be greater than the first SCS. The first sequence having the first SCS may have increased coverage to provide a decent or increased cell size, and improve the performance of the detector at the base station 504. While the first PRACH may provide a coarse timing resolution to the base station 504, the second sequence having the second SCS greater than the first SCS may increase the bandwidth over 50 MHz without a budget coverage loss, and a higher timing resolution may be achieved at the base station 504. The second sequence may have a limited coverage area that may specify a decreased cell size, and UE 502 may repeat the transmission of the second sequence in the time domain to increase the coverage of the second sequence. Since the second sequence has a greater SCS and a shorter symbol length, repeating the transmission of the second sequence may be less expensive as compared to the first sequence.

At 508, the base station 504 may transmit an indication of a configuration for the first sequence and an indication of a configuration for the second sequence. The UE 502 may receive the indication of the configuration for the first sequence and the indication of the configuration for the second sequence.

In one aspect, the CP and the symbol length of the second sequence may be greater than the coarse timing resolution of the first sequence. While the first sequence may provide a coarse timing resolution, since the first and the second sequences are transmitted as parts of one RACH procedure, the timing resolution of the first sequence may still need to fit within the CP and the symbol length of the second sequence. The above relation between the first sequence and the second sequence may be represented by the following formulae:

$$CP_{Seq2} > (1/SCS_{Seq1})/L_{Seq1}$$

$$1/SCS_{Seq2} > (1/SCS_{Seq1})/L_{Seq1}$$

where $CP_{Seq2}$ and $SCS_{Seq2}$ refer to the CP and the SCS of the second sequence, $SCS_{Seq1}$ and $L_{Seq1}$ refer to the SCS and the sequence length of the first sequence.

In another aspect, the first sequence and the second sequence may have various time/frequency configurations. For example, the first sequence and the second sequence may be transmitted back to back in time. In another example, the second sequence may be sent on a different transmission opportunity in time and/or frequency. That is, the second sequence may be sent with some time offset and/or frequency offset with respect to the first sequence.

At 510, the UE 502 may initiate the RACH procedure between the UE 502 and the base station 504. The UE 502 may be configured to send two sequences, the first sequence and the second sequence, to the base station 504 during the PRACH procedure.

At 512, the UE 502 may determine a power offset between the first sequence and the second sequence to indicate the quasi co-located (QCL) relationship between the first sequence and the second sequence. In one aspect, this may be implemented for the 2-step RACH procedure. The first sequence and the second sequence may have a configurable power offset, and the two sequences may be in a QCL relationship with each other. For example, the base station 504 may determine the QCL relationship between the first sequence and the second sequence based on parameters (e.g., Doppler shirt, Doppler spread, average delay, delay spread, and spatial received parameter) derived from the first and second sequences 524. The base station 504 may transmit the QCL relationship determination to the UE 502 in the RAR, so that the UE 502 may improve the beam formed transmissions.

At 514, the UE 502, as a part of the RACH procedure, transmits the first sequence having the first SCS (e.g., 120 kHz) based on the indication of the configuration for the first sequence received from the base station. At 516, the UE 502, as a part of the RACH procedure, transmits the second sequence having the second SCS based on the indication of the configuration for the second sequence received from the base station. The second SCS may be greater than the first SCS 516 to the base station 504.

In some aspects of the disclosure, the first sequence having the first SCS may be a first PRACH preamble, and the second sequence having the second SCS may be a second PRACH preamble, an SRS sequence, or a DMRS. In one aspect, the first sequence may be the first PRACH preamble and the second sequence may be the second PRACH preamble. In such configuration, the first PRACH preamble and the second PRACH preamble may compensate for each other. Particularly, the first PRACH preamble having the first SCS may have an improved coverage to provide an increased cell size and increased detection performance of the detector at the base station 504, while the second PRACH preamble having the second SCS greater than the first SCS may have an increased bandwidth to provide an increased timing resolution.

In another aspect, the first sequence may be the first PRACH preamble and the second sequence may be the SRS. Particularly, the second sequence may be the SRS for a contention-free based RACH procedure, such as a beam failure recovery (BFR) procedure or a handover procedure. When the UE 502 detects that the beam the UE 502 and the base station 504 are using for communication has a reference signal received power (RSRP) that is reduced below a certain value, the UE 502 may declare a beam failure. The UE 502 may enter the BFR procedure and search for a beam based on the channel state information reference signal (CSI-RS) received from the base station 504 or select a predefined beam as the best beam and send a RACH signal or an SRS, asking the base station 504 for permission to synch using the selected best beam. In a contention-free based RACH procedure, such as the BFR procedure or the handover procedure, the second sequence may be an acceptable option to send SRS due to the large bandwidth and increased timing resolution. The SRS may be used for sounding the channel for the downlink scheduling purposes. Furthermore, SRS may be sent via more than one port, compared to the PRACH which is sent on one port, which may enable massive DL MIMO or selection of a UL modulation and coding scheme (MCS) with higher performance.

In one aspect, the first sequence may be the first PRACH preamble, and the second sequence may be the DMRS to configure the 2-step RACH procedure. For the 2-step RACH procedure, the MsgA may include the PRACH preamble directly followed by the PUSCH transmission including multiple DMRS ports and DMRS sequences. The 2-step RACH procedure may be configured by the UE 502 using the first and second sequences, where the first sequence is configured to carry the PRACH preamble and the second sequence is configured to carry the PUSCH transmission including the multiple DMRS ports and sequences. Therefore, the DMRS for the MsgA may use a different SCS and may serve as the tracking RS. However, the embodiments are not limited thereto, and the first sequence may carry the entire MsgA, and additional DMRS may be carried by the second sequence. In a 4-step RACH procedure, one sequence of PRACH preamble may be used for the Msg1.

In some aspects, the UE 502 may repeat the transmission of the first sequence and/or repeat the transmission of the second sequence. At 518, the base station 504 may transmit a first configuration for a first number of repetitions for transmitting the first sequence and a second configuration for a second number of repetitions for transmitting the second sequence. The UE 502 may receive the first configuration for the first number of repetitions for transmitting the first sequence and the second configuration for the second number of repetitions for transmitting the second sequence.

At 520, the UE 502 may repeat the transmission of the first sequence based on the first configuration for a first number of repetitions based on the first configuration received from the base station 504. At 522, the UE 502 may repeat the transmission of the second sequence based on the second configuration for a second number of repetitions based on the second configuration received from the base station 504. In one aspect, the number of repetitions of the first sequence and the second sequence may also be predefined in the UE 502.

In some aspects, the second sequence may have a larger SCS and, therefore, have a smaller cell coverage area due to the shorter symbol length in time, and the second sequence may benefit from the repeated transmission of the second sequence. However, the embodiments are not limited thereto, and the numbers of repetitions of the first sequence and the number of repetitions of the second sequence are not limited to two repetitions. Furthermore, the number of repetitions of the first sequence and the second sequence may be independent of each other. Particularly, the number of repetitions of the first sequence and the number of repetitions of the second sequence may be independently configured or specified by the base station 504. In other words, the base station 504 may transmit a configuration for repetition of the transmission of the first sequence and repetition of the second sequence 508, and the UE 502 may repeat the transmission of the first sequence and the repetition of the second sequence in accordance to the received configuration. The number of repetitions of the first sequence and the second sequence may also be predefined in the UE 502.

At 524, the base station 504 may determine that the first sequence and the second sequence are QCL, based on the power offset between the first sequence and the second sequence determined at 512.

At 526, the base station 504 may transmit the RAR to the UE 502 in response to the first sequence and/or the second sequence received from the UE 502. The UE 502 may receive the RAR from the base station 504 in response to the first sequence and/or the second sequence transmitted to the base station 504.

Figure 6:
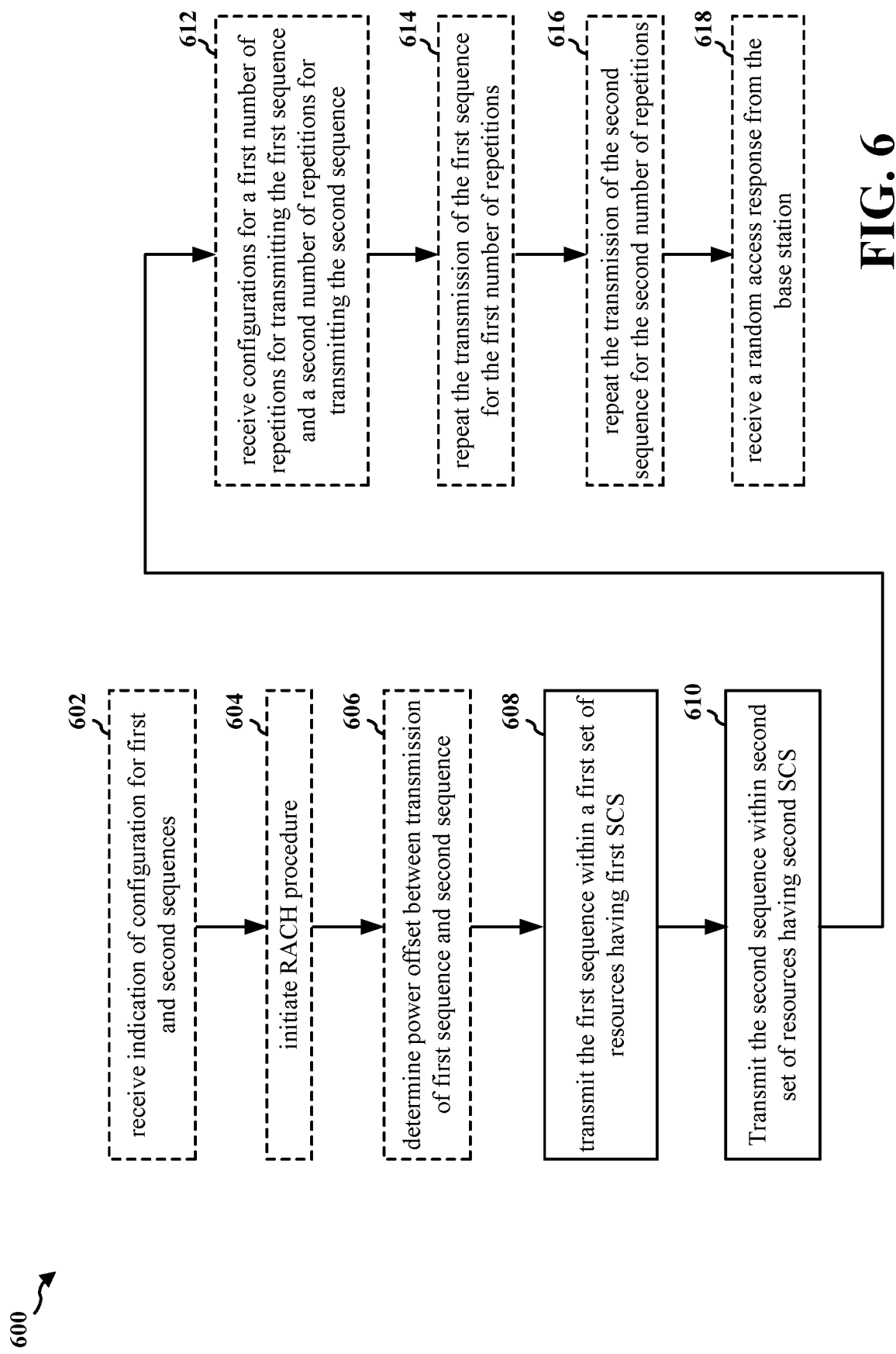
FIG. 6 is a flowchart of a method of wireless communication.

FIG. 6 is a flowchart 600 of a method of wireless communication of the UE. The method may be performed by a UE (e.g., the UE 104/350/402). Optional aspects are shown with a dashed line. The UE may transmit a first sequence having a first SCS and a second sequence having a second SCS greater than the first SCS. The first sequence may provide increased coverage, and the second sequence may provide increased bandwidth.

At 602, the UE may receive the indication of the configuration for the first sequence and the indication of the configuration for the second sequence. The configuration for the first sequence may indicate that the first sequence has a first SCS, and the configuration for the second sequence may indicate that the second sequence has a second SCS, where the second SCS may be configured to be greater than the first SCS. In some aspects, the first sequence and the second sequence may meet the following formulae:

$$CP_{Seq2} > (1/SCS_{Seq1})/L_{Seq1}$$

$$1/SCS_{Seq2} > (1/SCS_{Seq1})/L_{Seq1}$$

where $CP_{Seq2}$ and $SCS_{Seq2}$ refer to the CP and the SCS of the second sequence, $SCS_{Seq1}$ and $L_{Seq1}$ refer to the SCS and the sequence length of the first sequence.

In another aspect, the first sequence and the second sequence may have various time/frequency configurations. For example, the first sequence and the second sequence may be transmitted back to back in time. In another example, the second sequence may be sent on a different transmission opportunity in time and/or frequency. That is, the second sequence may be sent with some time offset and/or frequency offset with respect to the first sequence. For example, 602 may be performed by a multi SCS RACH component 840.

At 604, the UE may initiate the RACH procedure between the UE and the base station. That is, the UE may send two sequences, the first sequence and the second sequence, to the base station during the PRACH procedure. For example, 604 may be performed by the multi SCS RACH component 840.

At 606, the UE may determine a power offset between the first sequence and the second sequence to indicate the QCL relationship between the first sequence and the second sequence. For example, 606 may be performed by a transmission power managing component 842.

At 608, the UE, as a part of the RACH procedure, transmits the first sequence within the first set of resources having the first SCS based on the indication of the configuration for the first sequence received from the base station. At 610, the UE, as a part of the RACH procedure, transmits the second sequence within the second set of resources having the second SCS based on the indication of the configuration for the second sequence received from the base station. In some aspects of the disclosure, the first sequence having the first SCS may be a first PRACH preamble, and the second sequence having the second SCS may be a second PRACH preamble, an SRS sequence, or a DMRS. For example, 608 and 610 may be performed by the multi SCS RACH component 840.

At 612, the UE may receive a first configuration for a first number of repetitions for transmitting the first sequence and a second configuration for a second number of repetitions for transmitting the second sequence. In some aspects, the number of the repetitions of the first sequence and the second sequence may be independent of each other. That is, the number of repetitions of the first sequence and the second sequence may be independently configured or specified by the base station. The number of repetitions of the first sequence and the second sequence may also be predefined in the UE. For example, 612 may be performed by the multi SCS RACH component 840.

At 614, the UE may repeat the transmission of the first sequence based on the first configuration for a first number of repetitions based on the first configuration received from the base station at 612. At 616, the UE may repeat the transmission of the second sequence based on the second configuration for a second number of repetitions based on the second configuration received from the base station at 612. For example, 614 and 616 may be performed by the multi SCS RACH component 840.

At 618, the UE may receive a RAR from the base station in response to the first sequence and/or the second sequence transmitted to the base station at 608, 610, 614, and 616. For example, 618 may be performed by the multi SCS RACH component 840.

Figure 7:
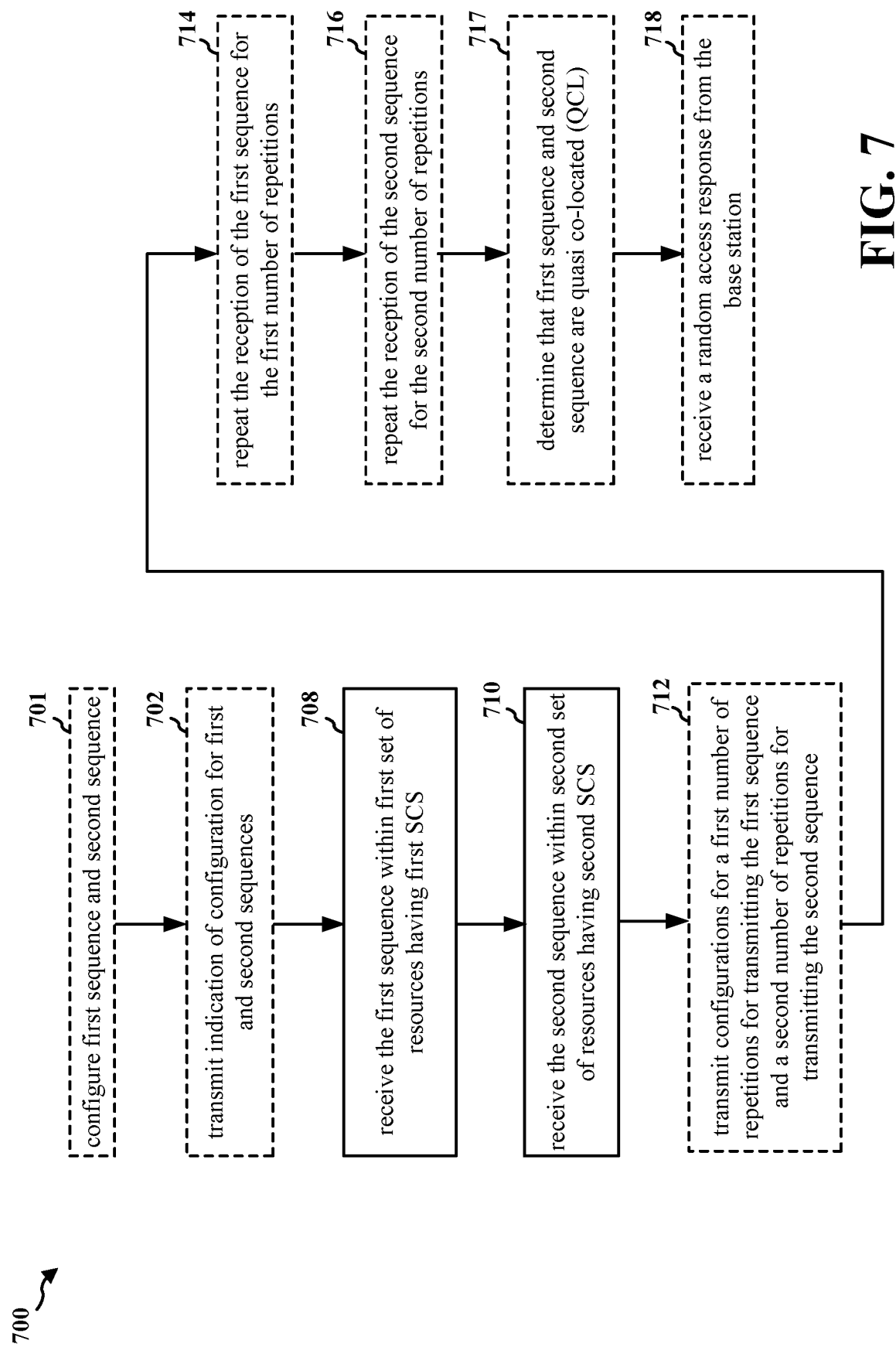
FIG. 7 is a flowchart of a method of wireless communication.

FIG. 7 is a flowchart 700 of a method of wireless communication of the base station. The method may be performed by a base station (e.g., the base station 102/180/310/404). Optional aspects are shown with a dashed line.

At 701, the base station may configure a first sequence with a first SCS configuration and a second sequence with a second SCS configuration for the UE. In one aspect, the second SCS may be configured to be greater than the first SCS. For example, 701 may be performed by a multi SCS RACH component 940.

At 702, the base station may transmit, to the UE, an indication of a configuration for the first sequence and an indication of a configuration for the second sequence. For example, 702 may be performed by a multi SCS RACH component 940. In one aspect, the CP and the symbol length of the second sequence may be greater than the coarse timing resolution of the first sequence. While the first sequence may provide a coarse timing resolution, since the first and the second sequences are transmitted as parts of one RACH procedure, the timing resolution of the first sequence may still need to fit within the CP and the symbol length of the second sequence. The above relation between the first sequence and the second sequence may be represented by the following formulae:

$$CP_{Seq2} > (1/SCS_{Seq1})/L_{Seq1}$$

$$1/SCS_{Seq2} > (1/SCS_{Seq1})/L_{Seq1}$$

where $CP_{Seq2}$ and $SCS_{Seq2}$ refer to the CP and the SCS of the second sequence, $SCS_{Seq1}$ and $L_{Seq1}$ refer to the SCS and the sequence length of the first sequence.

In another aspect, the first sequence and the second sequence may have various time/frequency configurations. For example, the first sequence and the second sequence may be transmitted back to back in time. In another example, the second sequence may be sent on a different transmission opportunity in time and/or frequency. That is, the second sequence may be sent with some time offset and/or frequency offset with respect to the first sequence.

At 708, the base station receives, as a part of the RACH procedure, the first sequence within the first set of resources having the first SCS based on the indication of the configuration for the first sequence received from the base station. At 710, the base station receives, as a part of the RACH procedure, the second sequence within the second set of resources having the second SCS based on the indication of the configuration for the second sequence received from the base station. In some aspects of the disclosure, the first sequence having the first SCS may be a first PRACH preamble, and the second sequence having the second SCS may be a second PRACH preamble, an SRS sequence, or a DMRS. For example, 708 and 710 may be performed by the multi SCS RACH component 940.

At 712, the base station may transmit a first configuration for a first number of repetitions for transmitting the first sequence and a second configuration for a second number of repetitions for transmitting the second sequence. In some aspects, the number of repetitions of the first sequence and the second sequence may be independent of each other. That is, the number of repetitions of the first sequence and the second sequence may be independently configured or specified by the base station. The number of repetitions of the first sequence and the second sequence may also be predefined. For example, 712 may be performed by the multi SCS RACH component 940.

At 714, the base station may repeat the reception of the first sequence based on the first configuration for a first number of repetitions based on the first configuration received from the base station at 712. At 716, the base station may repeat the reception of the second sequence based on the second configuration for a second number of repetitions based on the second configuration received from the base station at 712. For example, 714 and 716 may be performed by the multi SCS RACH component 940.

At 717, the base station may determine that the first sequence and the second sequence received from the UE have a QCL relationship based on one or more spatial receiver parameters derived from the first and second sequences received from the UE. That is, the first sequence and the second sequence may have a QCL relationship with each other, and the base station may determine the QCL relationship between the first sequence and the second sequence from the spatial parameters derived from the first and second sequences received from the UE. The base station may transmit the QCL relationship determination to the UE, so that the UE may improve the beam formed transmission. For example, 717 may be performed by a QCL component 942.

At 718, the base station may transmit a RAR to the UE in response to the first sequence received and/or the second sequence received from the UE at 608, 710, 714, and 716. For example, 718 may be performed by the multi SCS RACH component 940.

Figure 8:
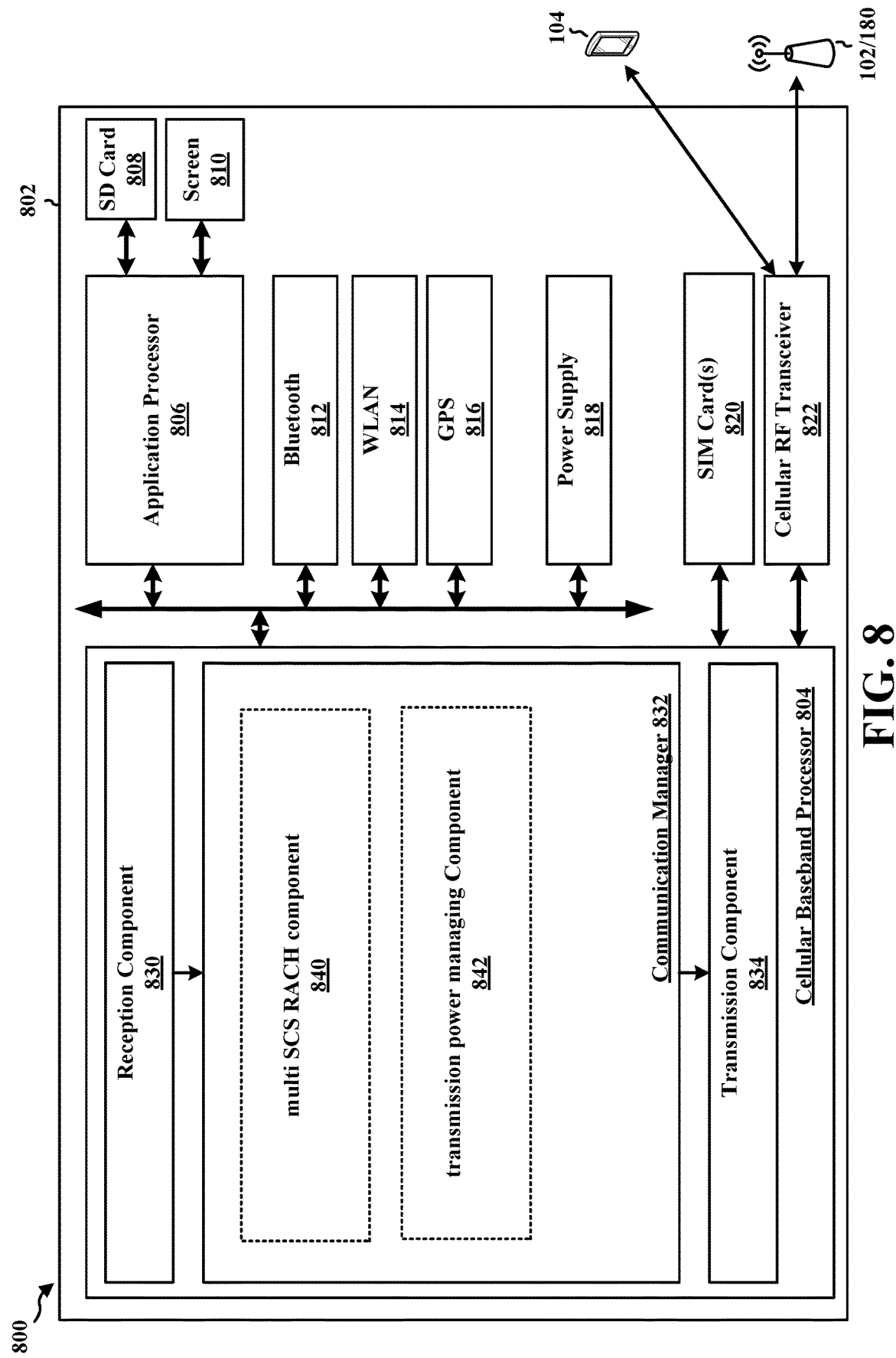
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a multi SCS RACH component 840 that is configured to receive indication of configurations for first and second sequences, initiate the RACH procedure, transmit the first and second sequence within the first and second sets of resources having the first and second SCSs, receive configurations for a first number of repetitions for transmitting the first sequence and a second number of repetitions for transmitting the second sequence, repeat the transmission of the first and second sequences, and receive a RAR, e.g., as described in connection with 602, 604, 608, 610, 612, 614, 616, and 618. The communication manager 832 further includes a transmission power managing component 842 that is configured to determine a power offset between the first sequence and the second sequence, e.g., as described in connection with 606.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving, from the base station, an indication of a configuration for a first sequence and an indication of a configuration for a second sequence, means for transmitting, as a part of a RACH procedure, the first sequence within a first set of resources having a first SCS ($SCS_1$), and means for transmitting, as a part of the RACH procedure, the second sequence within a second set of resources having a second SCS ($SCS_2$), the second SCS being greater than the first SCS. The apparatus 802 includes means for receiving a random access response based on the transmission of at least one of the first sequence or the second sequence, means for receiving a first configuration for a first number of repetitions for transmitting the first sequence, and a second configuration for a second number of repetitions for transmitting the second sequence, the first configuration and the second configuration being independent of each other. The apparatus 802 includes means for determining a power offset between the transmission of the first sequence and the transmission of the second sequence, where the first sequence is transmitted at a first transmission power, and the second sequence is transmitted at a second transmission power, the first transmission power and the second transmission power being based on the determined power offset. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
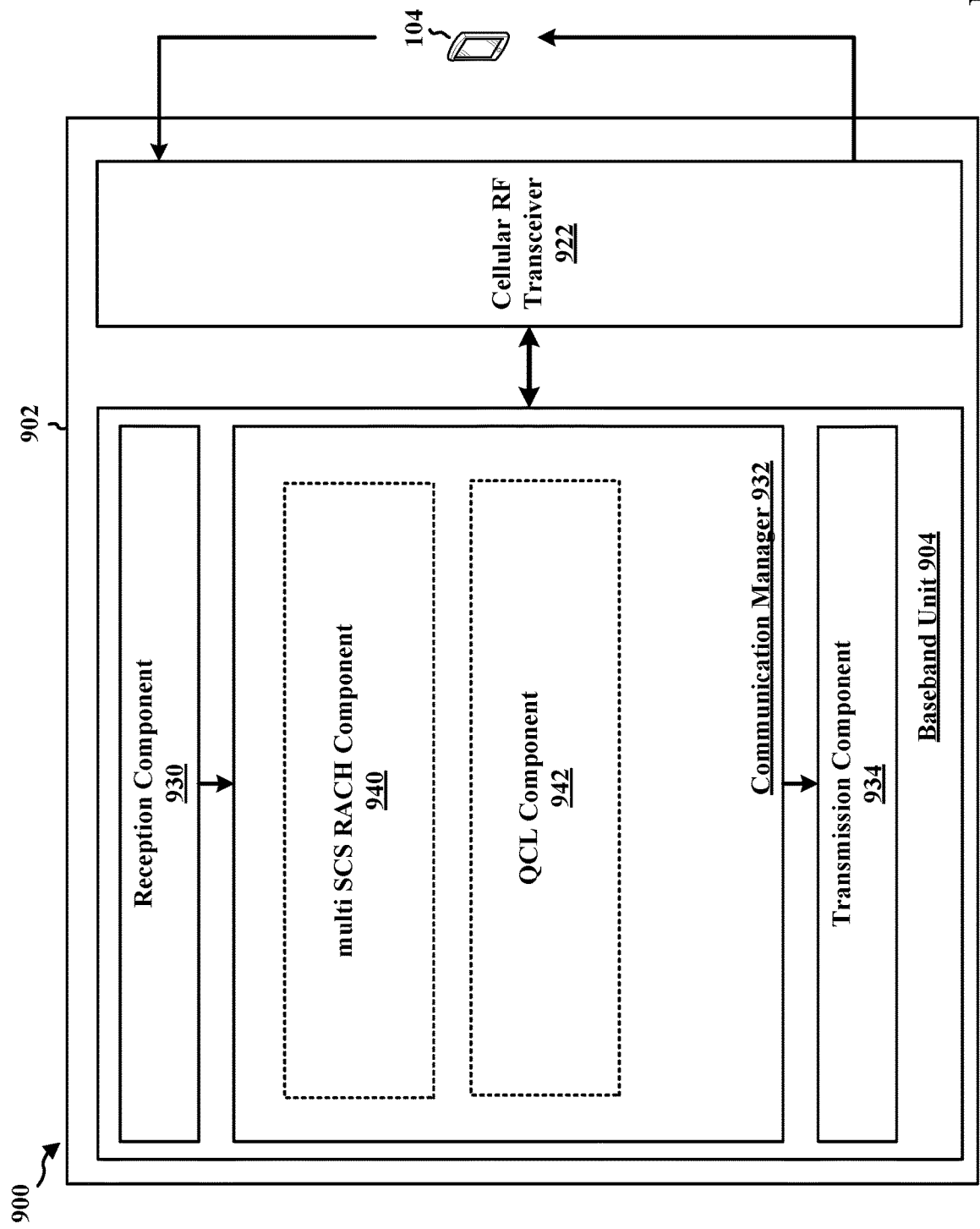
FIG. 9 is a diagram illustrating an example of a hardware implementation for an example apparatus.

FIG. 9 is a diagram 900 illustrating an example of a hardware implementation for an apparatus 902. The apparatus 902 is base station and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The communication manager 932 includes a multi SCS RACH component 940 that is configured to configure a first sequence with a first SCS configuration and a second sequence with a second SCS configuration, transmit, to the UE, an indication of a configuration for the first sequence and an indication of a configuration for the second sequence, receives, as a part of the RACH procedure, the first sequence within the first set of resources and the second sequence within the second set of resources having the second SCS, transmit a first configuration for a first number of repetitions for transmitting the first sequence and a second configuration for a second number of repetitions for transmitting the second sequence, repeat the reception of the first sequence and the second sequence, and transmit a RAR to the UE, e.g., as described in connection with 701, 702, 708, 710, 712, 714, 716, and 718. The communication manager 932 further includes a QCL component 942 that is configured to determine that the first sequence and the second sequence received from the UE have a QCL relationship based on one or more spatial receiver parameters derived from the first and second sequences received from the UE, e.g., as described in connection with 717.

The apparatus may include additional components that perform each of the blocks of the algorithm in the aforementioned flowcharts of FIGS. 5 and 7. As such, each block in the aforementioned flowcharts of FIGS. 5 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving, from a UE, as a part of a RACH procedure, a first sequence within a first set of resources having a first SCS ($SCS_1$), and means for receiving, from the UE, as a part of the RACH procedure, a second sequence within a second set of resources having a second SCS ($SCS_2$), the second SCS being greater than the first SCS. The apparatus 902 includes means for configuring a first sequence within a first set of resources having a first SCS ($SCS_1$), means for configuring a second sequence within a second set of resources having a second SCS ($SCS_2$), the second SCS being greater than the first SCS, and means for transmitting, to the UE, an indication of the configuration for the first sequence and an indication of the configuration for the second sequence. The apparatus 902 includes means for transmitting, to the UE, a random access response based on the reception of at least one of the first sequence or the second sequence, and means for transmitting, to the UE, a first configuration for a first number of repetitions for transmissions of the first sequence and a second configuration for a second number of repetitions for transmissions of the second sequence, the first configuration and the second configuration being independent of each other. The apparatus 902 means for determining that the first sequence and the second sequence have a QCL relationship based on a spatial Rx parameter, where the first sequence and the second sequence are received based on the QCL relationship indicating the spatial Rx parameter. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The method and apparatus for RACH communication may include a multi SCS configuration. As a part of the RACH communication procedure, the UE may transmit a first sequence within a first set of resources having a first SCS and a second sequence within a second set of resources having a second SCS greater than the first SCS to a base station. The second sequence may be transmitted with a cyclic prefix greater than a timing resolution of the first sequence which can be obtained by an inverse of the first SCS divided by a sequence length of the first sequence. The first sequence and the second sequence may be transmitted based on two different transmission opportunities that have a timing offset and/or a frequency offset, the two different transmission opportunities being associated with the same RACH procedure. By transmitting the two sequences having different SCS configurations, the first PRACH preamble having the first SCS may provide an improved coverage to support an increased cell size and improve the performance of the detector at the base station 504, while the second PRACH preamble having the second SCS greater than the first SCS may support an increased bandwidth without a budget coverage loss to provide a fine timing resolution.

The first sequence may be a first PRACH preamble. The second sequence may be a second PRACH preamble, an SRS sequence, or a DMRS.

The UE may repeat the transmission of the first sequence for a first number of times and repeat the transmission of the second sequence for a second number of times, the second number independent of the first number. The base station may transmit configurations for a first number of repetitions for transmitting the first sequence and a second number of repetitions for transmitting the second sequence.

The UE may also determine a power offset between the first sequence and the second sequence. The two sequences may be in a QCL relationship with each other, which may provide spatial receiver parameters to the base station. The base station may determine that the first sequence and the second sequence are in a QCL relationship based on the parameters derived from the first and second sequences received from the UE, and transmit the QCL relationship determination to the UE in the RAR, so that the UE may improve the beam formed transmissions.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Aspect 1 is a method of wireless communication at a UE, the method including transmitting, to a base station, as a part of a RACH procedure, a first sequence within a first set of resources having a first SCS ($SCS_1$), and transmitting, to the base station, as a part of the RACH procedure, a second sequence within a second set of resources having a second SCS ($SCS_2$), the second SCS being greater than the first SCS.

Aspect 2 is the method of aspect 1, where the first sequence is a first PRACH preamble and the second sequence is a second PRACH preamble.

Aspect 3 is the method of any of aspects 1 and 2, further including receiving a random access response based on the transmission of at least one of the first sequence or the second sequence.

Aspect 4 is the method of any of aspects 1 to 3, where the second sequence is transmitted with a CP greater than $(1/SCS_1)/L_{S1}$, where $L_{S1}$ is a sequence length of the first sequence.

Aspect 5 is the method of any of aspects 1 to 4, where $1/SCS_2$, the inverse of the second SCS, is greater than $(1/SCS_1)/L_{S1}$, where $L_{S1}$ is a sequence length of the first sequence.

Aspect 6 is the method of any of aspects 1 to 5, where the first sequence and the second sequence are time multiplexed during transmission.

Aspect 7 is the method of any of aspects 1 to 6, where the first sequence and the second sequence are transmitted based on two different transmission opportunities that have at least one of a TO or a FO, the two different transmission opportunities being associated with the same RACH procedure.

Aspect 8 is the method of any of aspects 1 to 7, further including receiving a first configuration for a first number of repetitions for transmitting the first sequence and a second configuration for a second number of repetitions for transmitting the second sequence, the first configuration and the second configuration being independent of each other.

Aspect 9 is the method of any of aspects 1 to 8, where the first sequence is a first PRACH preamble and the second sequence is an SRS sequence transmitted through SRS.

Aspect 10 is the method of any of aspects 1 to 9, further including determining a power offset between the transmission of the first sequence and the transmission of the second sequence, where the first sequence is transmitted at a first transmission power, and the second sequence is transmitted at a second transmission power, the first transmission power and the second transmission power being based on the determined power offset.

Aspect 11 is the method of any of aspects 1 to 10, where the first sequence is a PRACH preamble and the second sequence is transmitted through DMRS.

Aspect 12 is the method of any of aspects 1 to 11, further including receiving, from the base station, an indication of a configuration for the first sequence and an indication of a configuration for the second sequence.

Aspect 13 is an apparatus for wireless communication including at least one processor coupled to a memory and configured to implement a method as in any of aspects 1 to 12.

Aspect 14 is an apparatus for wireless communication including means for implementing a method as in any of aspects 1 to 12.

Aspect 15 is a computer-readable medium storing computer executable code, where the code when executed by a processor causes the processor to implement a method as in any of aspects 1 to 12.

Aspect 16 is a method of wireless communication at a base station, including receiving, from a UE, as a part of a RACH procedure, a first sequence within a first set of resources having a first SCS ($SCS_1$), and receiving, from the UE, as a part of the RACH procedure, a second sequence within a second set of resources having a second SCS ($SCS_2$), the second SCS being greater than the first SCS.

Aspect 17 is the method of aspect 16, further including configuring a first sequence within a first set of resources having a first SCS ($SCS_1$), and configuring a second sequence within a second set of resources having a second SCS ($SCS_2$), the second SCS being greater than the first SCS.

Aspect 18 is the method of any of aspects 16 and 17, further including transmitting, to the UE, an indication of the configuration for the first sequence and an indication of the configuration for the second sequence.

Aspect 19 is the method of any of aspects 16 to 18, where the first sequence is a first PRACH preamble and the second sequence is a second PRACH preamble.

Aspect 20 is the method of any of aspects 16 and 19, further including transmitting, to the UE, a random access response based on the reception of at least one of the first sequence or the second sequence.

Aspect 21 is the method of any of aspects 16 to 20, where the second sequence is received with a CP greater than $(1/SCS_1)/L_{S1}$, where $L_{S1}$ is a sequence length of the first sequence.

Aspect 22 is the method of any of aspects 16 to 21, where $1/SCS_2$, the inverse of the second SCS, is greater than $(1/SCS_1)/L_{S1}$, where $L_{S1}$ is a sequence length of the first sequence.

Aspect 23 is the method of any of aspects 16 to 22, where the first sequence and the second sequence are received TDD.

Aspect 24 is the method of any of aspects 16 to 23, where the first sequence and the second sequence are received based on two different reception opportunities that have at least one of a TO or a FO, the two different reception opportunities being associated with the same RACH procedure.

Aspect 25 is the method of any of aspects 16 to 24, further including transmitting, to the UE, a first configuration for a first number of repetitions for transmissions of the first sequence and a second configuration for a second number of repetitions for transmissions of the second sequence, the first configuration and the second configuration being independent of each other.

Aspect 26 is the method of any of aspects 16 to 25, where the first sequence is a first PRACH preamble and the second sequence is an SRS sequence received through SRS.

Aspect 27 is the method of any of aspects 16 to 26, further including determining that the first sequence and the second sequence have a QCL relationship based on a spatial Rx parameter, where the first sequence and the second sequence are received based on the QCL relationship indicating the spatial Rx parameter.

Aspect 28 is the method of any of aspects 16 to 27, where the first sequence is a PRACH preamble and the second sequence is received through DMRS.

Aspect 29 is an apparatus for wireless communication including at least one processor coupled to a memory and configured to implement a method as in any of aspects 16 to 28.

Aspect 30 is an apparatus for wireless communication including means for implementing a method as in any of aspects 16 to 28.

Aspect 31 is a computer-readable medium storing computer executable code, where the code when executed by a processor causes the processor to implement a method as in any of aspects 16 to 28.

What is claimed is:

1. An apparatus for wireless communication at a user equipment (UE), comprising:
   a memory; and
   at least one processor coupled to the memory and configured to:
      transmit, to a base station, as a part of a random access channel (RACH) procedure, a first sequence within a first set of resources having a first subcarrier spacing ($SCS_1$); and
      transmit, to the base station, as a part of the RACH procedure, a second sequence within a second set of resources having a second subcarrier spacing ($SCS_2$), the second subcarrier spacing being greater than the first subcarrier spacing, wherein the second sequence is transmitted with a cyclic prefix (CP) greater than $(1/SCS_1)/L_{S1}$, where $L_{S1}$ is a sequence length of the first sequence.

2. The apparatus of claim 1, wherein the first sequence is a first physical RACH (PRACH) preamble and the second sequence is a second PRACH preamble.

3. The apparatus of claim 1, wherein the at least one processor is further configured to receive a random access response in response to the transmission of at least one of the first sequence or the second sequence.

4. The apparatus of claim 1, wherein $1/SCS_2$, an inverse of the second subcarrier spacing, is greater than $(1/SCS_1)/L_{S1}$.

5. The apparatus of claim 1, wherein the first sequence and the second sequence are time multiplexed during transmission.

6. The apparatus of claim 1, wherein the first sequence and the second sequence are transmitted based on two different transmission opportunities that have at least one of a timing offset (TO) or a frequency offset (FO), the two different transmission opportunities being associated with a same RACH procedure.

7. The apparatus of claim 1, wherein the at least one processor is further configured to receive a first configuration for a first number of repetitions for transmitting the first sequence and a second configuration for a second number of repetitions for transmitting the second sequence, the first configuration and the second configuration being independent of each other.

8. The apparatus of claim 1, wherein the first sequence is a first physical RACH (PRACH) preamble and the second sequence is a sounding reference signal (SRS) sequence transmitted through an SRS.

9. The apparatus of claim 1, wherein the at least one processor is further configured to determine a power offset between the transmission of the first sequence and the transmission of the second sequence, wherein the first sequence is transmitted at a first transmission power, and the second sequence is transmitted at a second transmission power, the first transmission power and the second transmission power being based on the determined power offset.

10. The apparatus of claim 1, wherein the first sequence is a physical RACH (PRACH) preamble and the second sequence is transmitted through a demodulation reference signal (DMRS).

11. The apparatus of claim 1, wherein the at least one processor is further configured to receive, from the base station, an indication of a configuration for the first sequence and an indication of a configuration for the second sequence.

12. A method of wireless communication at a user equipment (UE), comprising:
   transmitting, to a base station, as a part of a random access channel (RACH) procedure, a first sequence within a first set of resources having a first subcarrier spacing ($SCS_1$); and
   transmitting, to the base station, as a part of the RACH procedure, a second sequence within a second set of resources having a second subcarrier spacing ($SCS_2$), the second subcarrier spacing being greater than the first subcarrier spacing, wherein the second sequence is transmitted with a cyclic prefix (CP) greater than $(1/SCS_1)/L_{S1}$, where $L_{S1}$ is a sequence length of the first sequence.

13. The method of claim 12, further comprising:
   receiving, from the base station, an indication of a configuration for the first sequence and an indication of a configuration for the second sequence.

14. An apparatus for wireless communication at a base station, comprising:
   a memory; and
   at least one processor coupled to the memory and configured to:
      receive, from a user equipment (UE), as a part of a random access channel (RACH) procedure, a first sequence within a first set of resources having a first subcarrier spacing ($SCS_1$); and
      receive, from the UE, as a part of the RACH procedure, a second sequence within a second set of resources having a second subcarrier spacing ($SCS_2$), the second subcarrier spacing being greater than the first subcarrier spacing, wherein the second sequence is received with a cyclic prefix (CP) greater than $(1/SCS_1)/L_{S1}$, where $L_{S1}$ is a sequence length of the first sequence.

15. The apparatus of claim 14, wherein the at least one processor is further configured to:
   configure the first sequence within the first set of resources having the first subcarrier spacing ($SCS_1$); and configure the second sequence within the second set of resources having the second subcarrier spacing ($SCS_2$), the second subcarrier spacing being greater than the first subcarrier spacing.

16. The apparatus of claim 15, wherein the at least one processor is further configured to transmit, to the UE, an indication of the configuration for the first sequence and an indication of the configuration for the second sequence.

17. The apparatus of claim 14, wherein the first sequence is a first physical RACH (PRACH) preamble and the second sequence is a second PRACH preamble.

18. The apparatus of claim 14, wherein the at least one processor is further configured to transmit, to the UE, a random access response in response to the reception of at least one of the first sequence or the second sequence.

19. The apparatus of claim 14, wherein $1/SCS_2$, an inverse of the second subcarrier spacing, is greater than $(1/SCS_1)/L_{S1}$.

20. The apparatus of claim 14, wherein the first sequence and the second sequence are time multiplexed during reception.

21. The apparatus of claim 14, wherein the first sequence and the second sequence are received based on two different reception opportunities that have at least one of a timing offset (TO) or a frequency offset (FO), the two different reception opportunities being associated with a same RACH procedure.

22. The apparatus of claim 14, wherein the at least one processor is further configured to transmit, to the UE, a first configuration for a first number of repetitions for transmissions of the first sequence and a second configuration for a second number of repetitions for transmissions of the second sequence, the first configuration and the second configuration being independent of each other.

23. The apparatus of claim 14, wherein the first sequence is a first physical RACH (PRACH) preamble and the second sequence is a sounding reference signal (SRS) sequence received through an SRS.

24. The apparatus of claim 14, wherein the at least one processor is further configured to determine that the first sequence and the second sequence have a quasi co-located (QCL) relationship based on a spatial receive (Rx) parameter, wherein the first sequence and the second sequence are received based on the QCL relationship indicating the spatial Rx parameter.

25. The apparatus of claim 14, wherein the first sequence is a physical RACH (PRACH) preamble and the second sequence is received through a demodulation reference signal (DMRS).

26. A method of wireless communication at a base station, comprising:
   receiving, from a user equipment (UE), as a part of a random access channel (RACH) procedure, a first sequence within a first set of resources having a first subcarrier spacing ($SCS_1$); and
   receiving, from the UE, as a part of the RACH procedure, a second sequence within a second set of resources having a second subcarrier spacing ($SCS_2$), the second subcarrier spacing being greater than the first subcarrier spacing, wherein the second sequence is received with a cyclic prefix (CP) greater than $(1/SCS_1)/L_{S1}$, where $L_{S1}$ is a sequence length of the first sequence.

27. The method of claim 26, further comprising:
   configuring the first sequence within the first set of resources having the first subcarrier spacing ($SCS_1$); and
   configuring the second sequence within the second set of resources having the second subcarrier spacing ($SCS_2$), the second subcarrier spacing being greater than the first subcarrier spacing.

28. The method of claim 27, further comprising:
   transmitting, to the UE, an indication of the configuration for the first sequence and an indication of the configuration for the second sequence.

* * * * *